United States Patent
Pommier et al.

(10) Patent No.: US 11,998,493 B2
(45) Date of Patent: Jun. 4, 2024

(54) MOTOR VEHICLE FOR A PERSON WITH REDUCED MOBILITY, WHICH IS EASIER TO GET INTO/OUT OF

(71) Applicants: Eric Pommier, Saint-Illiers-le-Bois (FR); Jean-Pierre Trideau, Chartres (FR); Christophe Raguideau, Mouettes (FR); Corinne Trideau, Houdan (FR)

(72) Inventors: Eric Pommier, Saint-Illiers-le-Bois (FR); Jean-Pierre Trideau, Chartres (FR); Christophe Raguideau, Mouettes (FR)

(73) Assignees: Corinne Trideau, Houdan (FR); Eric Pommier, Saint-Illiers-le-Bois (FR); Jean-Pierre Trideau, Chartres (FR); Christophe Raguideau, Mouettes (FR)

( * ) Notice: Subject to any disclaimer, the term of this patent is extended or adjusted under 35 U.S.C. 154(b) by 265 days.

(21) Appl. No.: 17/620,361

(22) PCT Filed: Jun. 15, 2020

(86) PCT No.: PCT/IB2020/055570
§ 371 (c)(1),
(2) Date: Dec. 17, 2021

(87) PCT Pub. No.: WO2020/254938
PCT Pub. Date: Dec. 24, 2020

(65) Prior Publication Data
US 2022/0233370 A1    Jul. 28, 2022

(30) Foreign Application Priority Data
Jun. 18, 2019 (FR) ...................................... 1906559

(51) Int. Cl.
*A61G 3/06* (2006.01)
*B62K 5/025* (2013.01)
*B62K 5/06* (2006.01)

(52) U.S. Cl.
CPC .............. *A61G 3/062* (2013.01); *B62K 5/025* (2013.01); *B62K 5/06* (2013.01)

(58) Field of Classification Search
CPC ... B62K 7/04; B62K 5/06; B62K 5/05; B62K 5/025; B62K 5/023; B62K 5/027;
(Continued)

(56) References Cited

U.S. PATENT DOCUMENTS 4,415,056 A * 11/1983 Smith .................... B62K 5/025
                                                        180/332
4,518,057 A *  5/1985 McCallum ............... B62K 5/06
                                                        475/326
(Continued)

FOREIGN PATENT DOCUMENTS

CN    202105112    1/2012
CN    202313987    7/2012
(Continued)

OTHER PUBLICATIONS

Search Report and Written Opinion for FR Application No. 1906559 dated Mar. 12, 2020, 13 pages.
(Continued)

*Primary Examiner* — Glenn F Myers
(74) *Attorney, Agent, or Firm* — NIXON & VANDERHYE

(57) ABSTRACT

The invention relates to a motor vehicle (1) comprising a chassis frame (2), a platform (5) and at least one folding side (6) movable between a raised position and a lowered position. The platform (5) comprises a stationary portion (50) and at least one lateral movable portion (51) vertically
(Continued)

Figure 1:
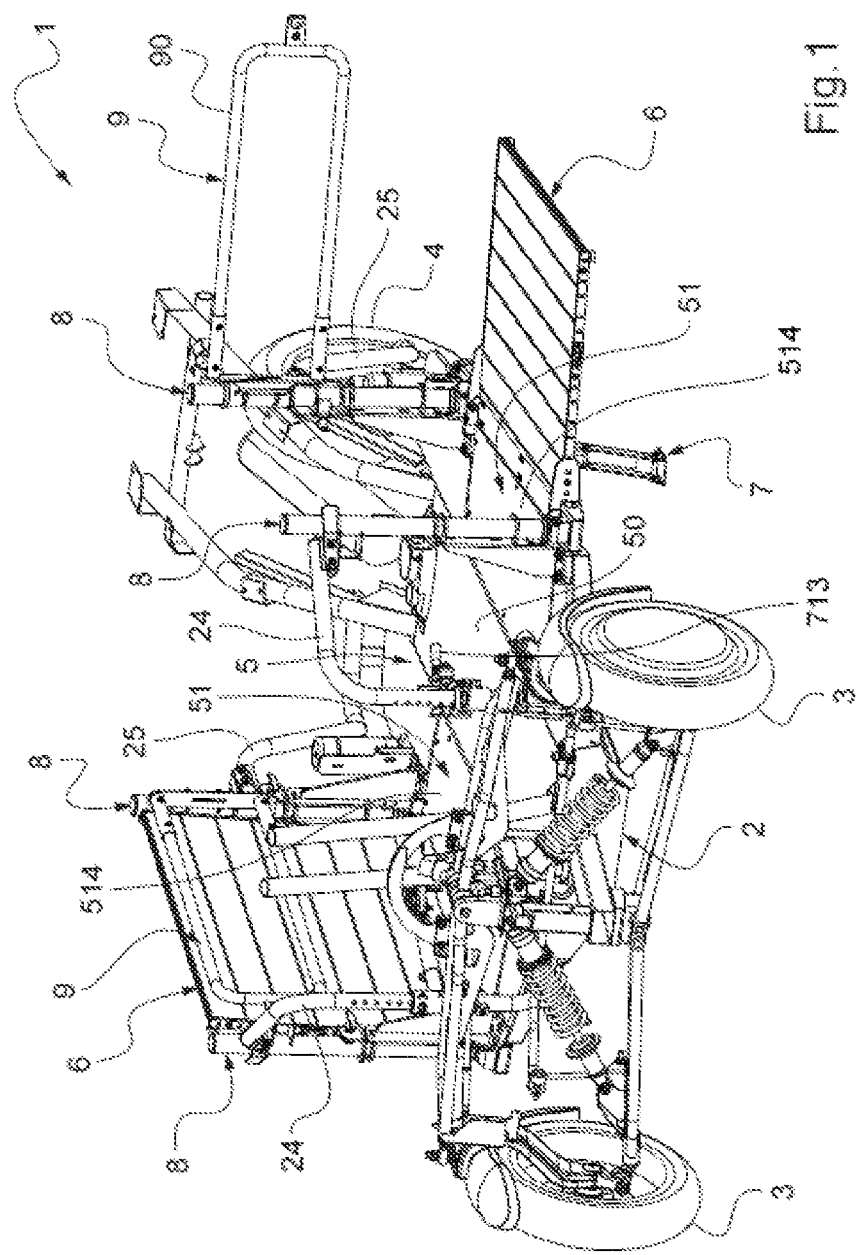

movable between a high position, in which it is flush with the stationary portion (50), and a low position, in which it has been lowered, there being provided means (7) for controlling the vertical movement of the at least one movable portion (51). The or each folding side (6) is connected to a respective movable portion (51) in such a way that they are vertically movable in one piece while the folding side (6) is in the lowered position.

18 Claims, 15 Drawing Sheets

(58) Field of Classification Search
CPC .......... B62K 5/007; B62K 5/08; B62M 23/02; A61G 3/066; A61G 3/062; A61G 3/06; B60P 1/44; B60P 1/4414; B60P 1/4421; B60P 1/02; B60P 1/022; B60P 1/025; Y10S 414/134
USPC .......................................... 414/545, 546, 921
See application file for complete search history.

(56) References Cited

U.S. PATENT DOCUMENTS

| | | | |
|---|---|---|---|
| 4,580,652 A * | 4/1986 | Turner | B62K 27/02 74/489 |
| 4,804,308 A | 2/1989 | Hamblin et al. | |
| 6,071,064 A * | 6/2000 | Hackett | A61G 3/066 414/812 |
| 6,234,740 B1 * | 5/2001 | Page | B60P 1/02 187/254 |
| 7,419,024 B1 * | 9/2008 | Tavantzis | A61G 3/061 180/53.6 |
| 8,763,186 B2 * | 7/2014 | Mosey | A61G 3/061 14/71.3 |
| 2016/0242975 A1 * | 8/2016 | Kitchin | A61G 3/061 |
| 2017/0296405 A1 * | 10/2017 | Clevenger | B60N 2/01516 |

FOREIGN PATENT DOCUMENTS

| | | |
|---|---|---|
| CN | 108836647 | 11/2018 |
| FR | 3 005 931 | 11/2014 |

OTHER PUBLICATIONS

International Search Report for PCT/IB2020/055570 dated Sep. 15, 2020, 7 pages.

Written Opinion of the ISA for PCT/IB2020/055570 dated Sep. 15, 2020, 12 pages.

* cited by examiner

MOTOR VEHICLE FOR A PERSON WITH REDUCED MOBILITY, WHICH IS EASIER TO GET INTO/OUT OF

This application is the U.S. national phase of International Application No. PCT/IB2020/055570 filed Jun. 15, 2020 which designated the U.S. and claims priority to French Patent Application No. 1906559 filed Jun. 18, 2019, the entire contents of each of which are hereby incorporated by reference.

The present invention relates to the technical field of vehicles for persons with reduced mobility and whose physical capacity does not allow the driving of a traditional vehicle without transformation of the latter, and relates in particular to a motor vehicle allowing an extremely easy and safe way to get into and out of.

A motor tricycle, proposed by the inventors of the present invention, is known from French patent application FR 3 005 931, allowing such a person to recover a lost autonomy while having the pleasure of driving in a vehicle whose design is modern.

Briefly, the chassis frame of this motor tricycle has a platform on which can be carried a person in a wheelchair, or which can be equipped with a specific chair with armrests fixed to the chassis frame, and two steerable wheels located at the front and a driving wheel at the rear, aligned with the longitudinal axis of the tricycle. The tricycle has a side access on each side of the platform, through a side door mounted to pivot about a horizontal axis at the platform. In the closed position, the side door is raised and closes off the tricycle's interior laterally, and in the open position, the side door is lowered and forms an inclined ramp whose free edge can rest directly on a sidewalk.

The main advantages of this tricycle, due to the lateral access it offers, are that it allows the driver to park in a motor vehicle space and to get off directly onto the sidewalk, and not on the roadway with the risks and inconveniences that this entails, as well as to allow for a space behind the driving position, leaving one or even two places, according to the motorization power, to accommodate one or two passengers. It therefore allows to travel over long distances with an unequalled level of comfort.

The tricycle according to the French patent application FR 3 005 931 is therefore a satisfactory solution in principle.

However, in practice, getting on/off the tricycle can in some cases be difficult or even impossible, for example for people who do not have enough strength to climb the ramp, or when the slope of the ramp is too steep, for example when there is no sidewalk. To try to overcome this disadvantage, a hydraulic system has been provided to temporarily lower the entire tricycle. However, such a lowering, besides resulting in a compression of the shock absorbers when the tricycle is in the lowered position, which is not admissible in the long term for the shock absorbers and the wheel tires, prevents fixing motorization elements, etc., under the chassis frame, and thus leads to a more complex arrangement of the tricycle, as it is very different from motor tricycles not intended for people with reduced mobility.

It has been proposed to connect the ramp to a movable portion of a vehicle platform. For example, in US application No. 2016/0242975 A1 request, the ramp is connected to a movable portion that can pivot up and down. In U.S. Pat. No. 4,804,308, the ramp is connected to a movable portion of the platform that is vertically movable between high and low positions, with the ramp beginning its downward pivoting movement when the movable portion has begun to approach its low position and beginning its upward pivoting movement at the beginning of the raising of the movable portion to the high position. In both of these examples, only the movable portion of the platform accommodates the person in the wheelchair during the vertical movement between the high and low positions, and getting on and off this movable portion is still via an inclined ramp. Thus, the problems presented above are not solved.

The present inventors have sought to solve these problems and to provide a motor tricycle of simple structure and allowing easy access when getting on and off in all cases.

The solution according to the present invention is based on the use, for getting on/off, of a vertically movable portion forming part of the platform in the driving position, to which movable portion is connected a folding side that can be placed in a horizontal position in which it is movable in one piece with said movable portion, as will be explained in more detail hereinafter.

The present inventors have realized that this solution is not limited to motor tricycles, but can also be applied to any motor vehicle, such as cars.

The present invention thus relates to a motor vehicle, comprising:
  a chassis frame,
  a steerable front wheel assembly and a rear wheel assembly,
  a platform for accommodating at least the driver of the vehicle, at least a portion of the platform being secured to the chassis frame, and
  at least one folding side located on one side of the platform and connected thereto so as to be able to pivot between a so-called raised position, in which the folding side has been raised and is generally vertical, and a so-called lowered position, in which the folding side has been pivoted downwards to form a means of access by which a person can get onto the platform and get off the same,
the vehicle being characterized in that the platform comprises a stationary portion secured to the chassis frame and at least one lateral movable portion located at one side of the platform, the movable portion being vertically movable relative to the stationary portion in such a way as to be able to be placed in a first position, called the high position, in which it is flush with the stationary portion, and a second position, called the low position, in which it is located at a lower height than that of the stationary portion, means being provided for controlling the vertical movement of the at least one movable portion, the or each folding side being connected to a respective movable portion in such a way that the folding side and the respective movable portion are vertically movable in one piece between the high and low positions while the folding side is in the lowered position.

Thus, when a folding side has been placed in the lowered position, the folding side and the respective movable portion to which it is connected constitute a movable sub-platform which on the one hand is of sufficient size for a person in a wheelchair to be able to be placed on it and on the other hand is vertically movable while remaining generally horizontal. In other words, the folding side and the respective movable portion are vertically movable in one piece from the high position to the low position, and vice versa, with the folding side in the lowered position throughout the entire vertical movement of the movable portion.

It is easily understood that when the person wishes to get off the vehicle, he or she simply pivots the folding side to the lowered position, moves onto the sub-platform thus formed, and then lowers the sub-platform to the desired height, such as that of a sidewalk or directly onto the roadway. When the person wants to get on the vehicle, he/she only has to proceed with the same method, except that this time the sub-platform is raised to the high position, from which the person can raise the folding side.

It can therefore be seen that the means of access is generally horizontal when getting on/off, which allows an easy access even for people who do not have enough strength to climb a ramp, which by definition is inclined, as in the prior art.

Moreover, this result is achieved without increasing the length of the side door in the case where the folding side constitutes a side door of the vehicle, and thus a reduced lateral overall dimension is maintained even when getting on/off, which is particularly important to allow getting on/off when space is limited at the side of the vehicle, as for example in parking lots.

Finally, according to the solution of the present invention, the shock absorbers are no longer stressed when getting on/off and the height of the chassis frame is not modified, which allows to keep a conventional positioning for the elements of motorization, drivetrain, etc., making the design of this aspect of the vehicle and its manufacture much simpler.

Consequently, the vehicle according to the present invention retains the advantages provided by that of the French patent application FR 3 005 931 while solving the problems it posed.

It is advantageous to provide, at a free edge of the or each folding side, a lip, preferably foldable, which, in the lowered position of the folding side, preferably at least when approaching the lowered position of the movable portion, is inclined relative to the rest of the folding side so as to facilitate getting onto said folding side and getting off the same by preventing said free edge of the folding side, which would otherwise form a small step, of the thickness of the folding side, from constituting an obstacle to the wheels of the wheelchair.

It is underlined here that the term "folding side" is understood to mean any element of the panel or plate type capable, in the lowered position, of forming a means of access to the platform.

Preferably, the vehicle further comprises stabilizing means for stabilizing the vehicle during the movement of the at least one movable portion between the high and low positions. This further increases the safety of the person with reduced mobility.

By "stabilizing means" is meant dedicated means allowing the vehicle to be kept immobile when getting on/off, in addition to the conventional means such as handbrakes which are used to immobilize the vehicle.

An example of stabilizing means is stabilizing jacks designed to raise the vehicle above the ground, well known for example in motor homes and truck cranes. The number of such stabilizing jacks and their position can be determined in particular by the weight and dimensions of the vehicle, and two stabilizing jacks, one in the front region of the vehicle and the other in the rear region, could be provided under each side of the platform.

Preferably, the stabilizing means will be formed by the at least one stand forming part of the means for controlling the vertical movement of the at least one movable portion according to one embodiment that will be discussed below.

Preferably, the at least one movable portion forms part, in the high position, of the section of the platform where the driving position of the vehicle is located. This will be preferred, for example, when the vehicle is a tricycle. Thus, the vehicle may be a tricycle, including a tricycle in which the steerable front wheel assembly comprises a single front wheel and the rear wheel assembly includes two rear wheels, or a tricycle in which the steerable front wheel assembly includes two front wheels and the rear wheel assembly includes a single rear wheel or two twin rear wheels.

The at least one movable portion may also form part, in the high position, of a section of the platform intended to accommodate a passenger of the vehicle, the vehicle comprising two front wheels and at least two rear wheels.

Preferably, the vehicle comprises two folding sides, located on either side of the platform, and two movable portions. Thus, it is possible to get on/off the vehicle from both sides of the vehicle, as required.

The at least one folding side may constitute, in the raised position, a side door of the vehicle.

Alternatively, the vehicle may further comprise at least two side doors, located on either side of the platform and capable of being opened and closed, the or each folding side extending, in the raised position, opposite a respective side door, on the interior side of the vehicle, the or each folding side being capable of being moved to the lowered position after opening the respective side door. The solution according to the present invention is therefore fully applicable to conventional vehicles, where only the design of the chassis frame needs to be modified for the integration of the at least one movable portion of the platform.

The vehicle may further comprise, for the or each folding side, a non-manual actuator able to move the respective folding side between the raised position and the lowered position. This actuator may take any suitable form, such as electric or hydraulic jacks, etc.

Alternatively, the or each folding side may be connected in a freely pivotable manner to the respective movable portion of the platform, there being further provided, for the or each folding side, manual raising means for raising the folding side from the lowered position to the raised position, as well as stopping means for stopping the folding side in the lowered position and locking means for locking the folding side in the raised position.

The raising means may comprise, for the or each folding side, a horizontal handrail mounted so as to be pivotable about a vertical axis located in front of or behind the respective movable portion of the platform, the handrail being further connected to an edge of the folding side by a belt or strap. Such raising means are particularly dependable and simple to implement, as the handrail can also be used by the person to move around on the folding side/moving portion when getting on/off.

Preferably, the chassis frame is configured such that the at least one movable portion is, in the high position, inscribed in and protected by the chassis frame.

In other words, for the or each movable portion, the structural elements of the chassis frame define sides of an opening forming a space in which the movable portion is placed in the high position, these structural elements thus protecting said movable portion.

Particularly in the case where the vehicle is a tricycle, the chassis frame may comprise a central portion and, on each side thereof, a front lateral extension and a rear lateral extension, the chassis frame thus being H-shaped, a space being formed between the front and rear lateral extensions located on the same side of the central portion, in which space a respective movable portion of the platform is placed when in the high position.

With this configuration of the chassis frame, the movable portions of the platform form a section of the surface of the platform upon which the person is when in the driving position, thus not increasing the lateral dimensions of the vehicle, and the movable portions are furthermore inscribed in the chassis frame and protected by it when the vehicle is being driven.

For the or each movable portion, locking means for locking the movable portion in the high position may be provided, such as means with locking fingers which, in a so-called locking position, oppose a movement of the movable portion and in a so-called release position, no longer oppose such a movement.

Preferably, the means for controlling the vertical movement of the at least one movable portion are able to ensure a continuous vertical movement of the at least one movable portion and to stop this vertical movement at any height lower than that of the movable portion in the high position. In this way, the user can define the low position of the movable portion depending on the needs, as for example depending on the height of the sidewalk or to go directly onto the road.

The means for controlling the vertical movement of the at least one movable portion may be manual. A manual crank system could thus be provided, which would be turned by the user, and which would make the movable portion go up and down, for example via a wheel and worm screw system, with the interposition of a force multiplier.

Preferably, the means for controlling the vertical movement of the at least one movable portion comprises, for the or each movable portion, at least one non-manual actuator.

In one exemplary embodiment, the or each actuator is a linear actuator, in particular a jack, a first part of which, called fixed, is secured to the chassis frame and a second part of which, called movable, is connected to the respective movable portion of the platform. The vehicle may advantageously comprise, on each side of the fixed portion of the platform where a movable portion is located, at least one tubular structure secured to the chassis frame and comprising an upright carrying a support to which the fixed part of a respective linear actuator is connected. A single actuator may be provided for each movable portion. In this case, it will be advantageous to provide on the side opposite to the one where the actuator is located, a translation guide, such as a ball bearing slide for example, to ensure that the movable portion and the folding side remain globally horizontal when getting on/off. Preferably, on each side of the fixed portion of the platform where a movable portion is located, a front tubular structure and a rear tubular structure are provided, to each of which the fixed part of a linear actuator is connected, so that the movement of each movable portion of the platform is controlled by two linear actuators. The linear actuator(s) may, for example, be hydraulic jacks, electric jacks, etc., or consist of a rack-and-pinion mechanism whose rack is secured to the movable portion and extends upwardly therefrom. In the case of such linear actuators, the vehicle stabilizing means may be stabilizing jacks, as mentioned above.

However, according to one preferred embodiment, the means for controlling the vertical movement of the at least one movable portion comprises, for the or each movable portion:
an actuator formed by a stand foldable under said movable portion and able to be unfolded downwards from the latter, the stand being motorized by motorization means, the stand constituting said stabilizing means; and
means for guiding said movable portion in translation with respect to the chassis frame.

When the stand is in contact with the ground, its folding allows the movable portion to be lowered while its unfolding allows it to be raised. The motorization means will preferably ensure a continuous movement of the stand, in both directions, allowing to stop the movable portion at any height, as mentioned above.

In addition to the function of raising/lowering the movable portion/folding panel, the stand ensures a stabilization function of the whole vehicle throughout the raising/lowering, which is particularly important from the point of view of safety of the person with reduced mobility.

Preferably, the stand comprises a main arm and a secondary arm, the main arm having a first end articulated to a part located inside a hollow longitudinal member belonging to the movable portion, and a second end capable of coming to bear on the ground after the stand has been unfolded, the secondary arm being foldable inside the main arm and having a first end articulated to the latter and a second end articulated to a bearing fixed inside said longitudinal member, and the motorization means comprises said part and means for driving said part in translation in the two direction of translation.

It is readily understood that since the end of the secondary arm which is articulated to the bearing is fixed in translation, a translational movement of said part, and thus of the end of the main arm which is articulated thereto, away from said bearing causes the main arm and the secondary arm to fold back towards said longitudinal member, whereas a movement towards said bearing causes the main arm and the secondary arm to unfold.

Preferably, the part is a sleeve and the means for driving said part in translation comprises a shaft extending through said sleeve and along the inside of said longitudinal member, and means for rotating the shaft that are able to rotate the shaft in both directions of rotation, the sleeve and the shaft being connected by a helical connection such that a rotation of the shaft causes a translation of the sleeve. For example, the shaft may be a ball splined shaft and the sleeve may be a ball cage sleeve, in which case the means for driving in translation is implemented as a ball screw, or the shaft may be externally threaded and the sleeve internally threaded, in which case the means for driving in translation is implemented as a screw-nut system.

The second end of the main arm may be provided with a caster. Thus, when the movable portion is in a low position, i.e., when a person is getting on or off, it is possible to roll the vehicle over a small distance in order not to leave it in a dangerous position, for example. Together with this ability to move, this caster allows for a slight height misalignment between, on the one hand, the point of contact with the ground and, on the other hand, the axes of articulation of the main and secondary arms inside said hollow longitudinal member, which allows to reduce the power that must be provided by the motorization means at the beginning of the raising, and thus to relieve the latter.

In a preferred variation, the second end of the main arm is provided with an articulated plate, preferably articulated about a first pivot axis that is horizontal and parallel to the longitudinal axis of the main arm, and a second pivot axis that is horizontal and perpendicular to the first pivot axis, one of the first and second pivot axes being located above the other. Such an articulation, and particularly with the preferred configuration indicated above, allows the plate to be properly placed on an inclined ground for a proper stabilization by the stand. Moreover, the use of such a plate allows to offer a larger contact surface with the ground, compared to the use of a simple castor, and thus to avoid that the stand sinks into the ground, for example in case of muddy ground. The plate thus allows the stand to ensure its stabilization function in all cases.

Preferably, the means for guiding in translation consist of, for the or each movable portion, two sliding connections, each at a lateral edge of said movable portion and each comprising a fixed guiding part secured to the chassis frame and a sliding guiding part secured to said movable portion.

In the case where the vehicle is a tricycle, it may advantageously comprise, on each side of the central portion of the platform, at least one tubular structure secured to the chassis frame and comprising an upright to which, where appropriate, the fixed guide part of a sliding connection is fixed. The tubular structure(s) may also serve as a support for accessories, such as, for example, reflectors, lamps, wheelchair immobilization clamps, at the front and rear, etc.

In the case where the vehicle is a tricycle, it may advantageously comprise, behind the driving position of the vehicle, at the rear of the platform, a seat support which is foldable and/or removable so as to be able to be placed in a first position, so-called position of use, in which it supports a single or double seat, or a second position in which it has been folded down or, if applicable, removed, in order to free the section of the platform located behind the driving position, so as to allow a person in a wheelchair to position themselves behind said driving position. Advantageously, a removable and/or collapsible front seat may also be provided in the driving position for use when the wheelchair is behind the driving position.

The features of the present invention described above are not limited to the specific type of motorization used for the vehicle. However, it will be readily understood that it is important that such motorization allows for travel in reverse. Indeed, since the vehicle according to the present invention allows a person with reduced mobility to get on and off the vehicle very easily, particularly onto a sidewalk, to fully benefit from the advantages provided by the present invention the driver must be able to perform maneuvers such as parallel parking, herringbone parking, etc., which require travel in reverse.

In the context of incorporating such a reverse gear into a vehicle according to the present invention which would be a tricycle, the present inventors have developed an innovative reverse gear system which can be used in the case where the rear wheel assembly of the vehicle is a single rear wheel or two twin rear wheels.

Thus, preferably, the vehicle according to the present invention includes a reverse gear system able to drive in reverse rotation the wheel axle of the rear wheel assembly, the reverse gear system comprising:
  a dedicated motor means, comprising a driving shaft intended, in use, to rotate in a direction of rotation leading to a reverse movement of the vehicle, parallel to the wheel axle;
  selective coupling means controllable so as to couple or uncouple the driving shaft and the wheel axle; and
  means for controlling the selective coupling means.

Preferably, the selective coupling means is a clutch, so-called reverse clutch, a first part of which is fixed in rotation, directly or indirectly, to the driving shaft and a second part of which is fixed in rotation, directly or indirectly, to the wheel axle.

Preferably, the dedicated motor means is an angle drive electric motor, which allows the motor means to be arranged so that its longitudinal direction is parallel to that of the vehicle, in this way the reverse gear system is compact and fits easily behind the vehicle bodywork, without protruding laterally from the latter.

The means for controlling the selective coupling means, in particular the reverse clutch, may be formed by any suitable means, which are well known per se, and these means may be, for example, mechanical, hydraulic or electrical.

Advantageously, the reverse clutch may be an electromagnetic clutch, for example with teeth.

The reverse clutch could be interposed directly between the driving shaft and the wheel axle, without interposing complementary elements such as a drivetrain.

However, in a preferred embodiment, the vehicle comprises a forward drive system comprising a motor means for forward drive, located forward of the rear wheel assembly and having a driving shaft connected by a belt to a drivetrain which comprises a drive shaft rotated by the belt and driving the wheel axle in forward drive rotation, the drive shaft extending outwardly so that an end section thereof lies beyond said belt, the selective coupling means, if applicable the second part of the reverse clutch, being connected to said end section of the drive shaft.

The present inventors have realized that the reverse gear system as defined above is not limited to use on a vehicle according to the present invention, i.e., incorporating a movable portion and a folding side for getting a person with reduced mobility on/off, but that it could also be used for conventional two or three-wheeled vehicles of scooter type.

Indeed, conventionally, two or three-wheeled vehicles like scooters are not equipped with a reverse gear system and it is up to the user, by his or her own strength, to move the vehicle backwards while controlling it, which in practice is at best delicate for people of good stature, but very difficult for most people. In any case, moving the vehicle backwards is tedious.

The reverse gear system solves this problem, as the user only has to steer the vehicle, and no longer has to move it by their own force.

Thus, there is disclosed herein a reverse gear system for a scooter-type motor vehicle having a single rear wheel assembly, which may consist of, for example, a single rear wheel or two twin rear wheels, the reverse gear system being able to drive the wheel axle of the rear wheel assembly in reverse rotation, the reverse gear system being characterized in that it comprises:
  a dedicated motor means, comprising a driving shaft;
  selective coupling means controllable so as to couple or uncouple the driving shaft and the wheel axle; and
  means for controlling the selective coupling means.

The optional features of the reverse gear system described in connection with the vehicle according to the present invention are also optional features of the reverse gear system as defined in the preceding paragraph.

By "dedicated motor means" is meant that the motor means providing reverse travel is separate from that providing forward travel.

To better illustrate the object of the present invention, particular embodiments thereof will be described hereinafter, with reference to the appended drawings.

Figure 2:
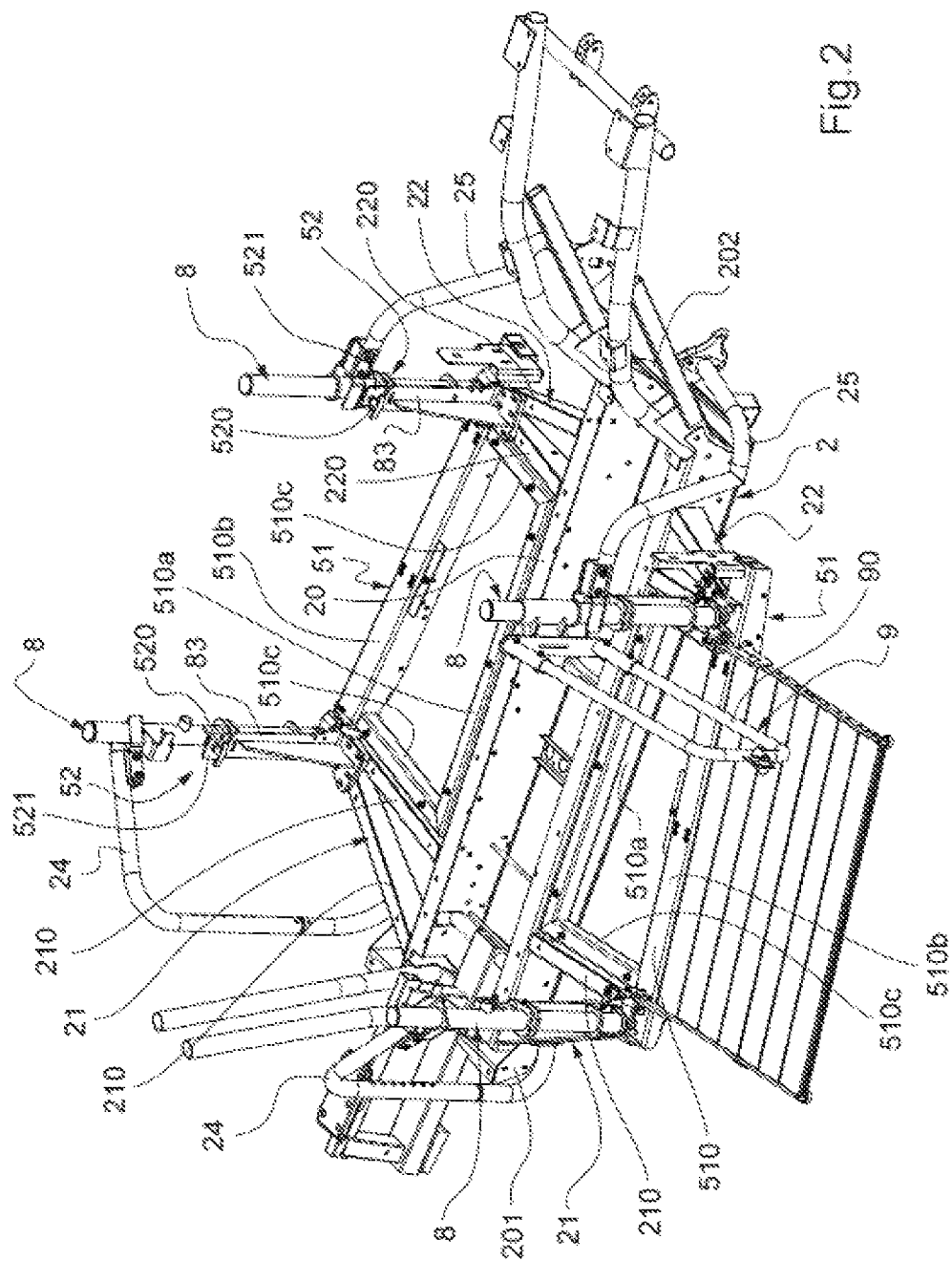
Figure 3:
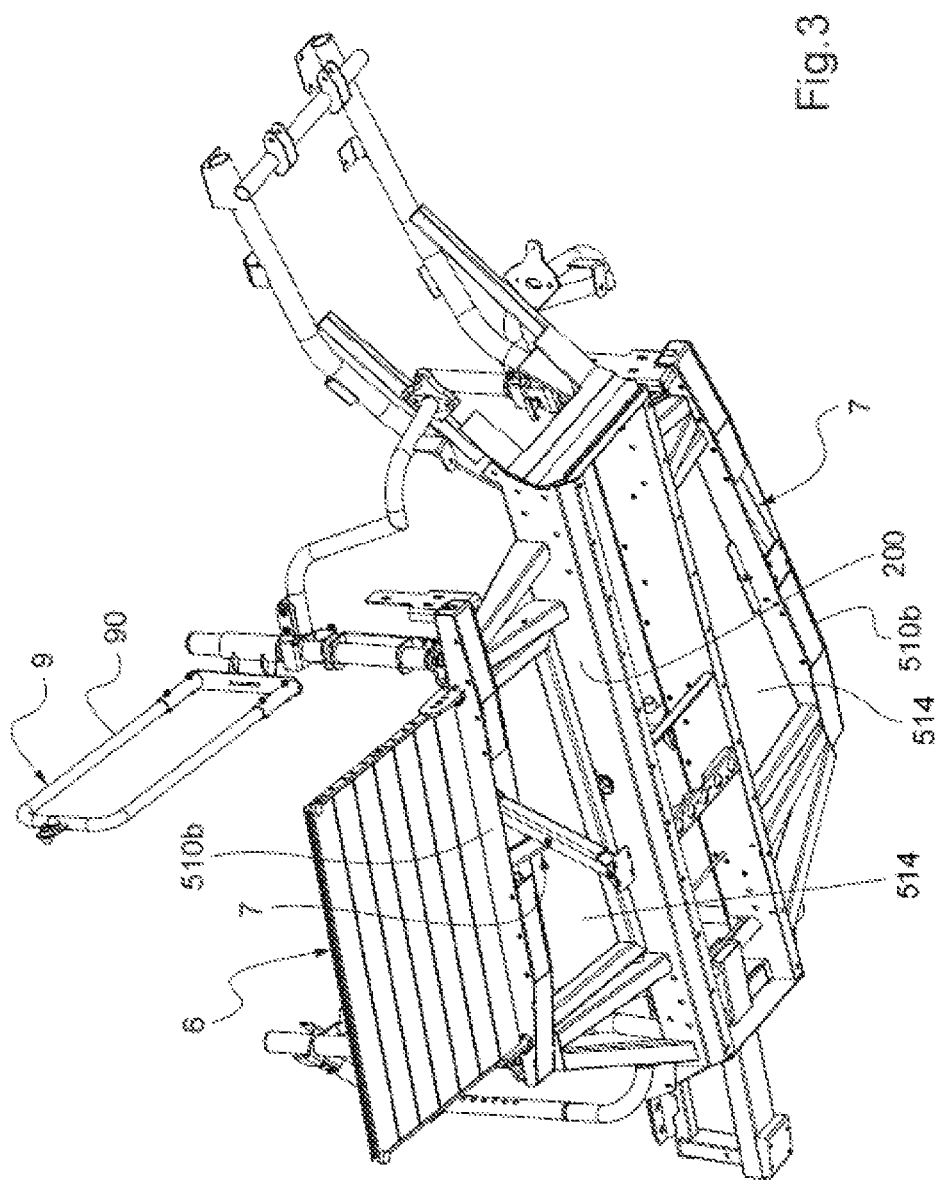
Figure 4:
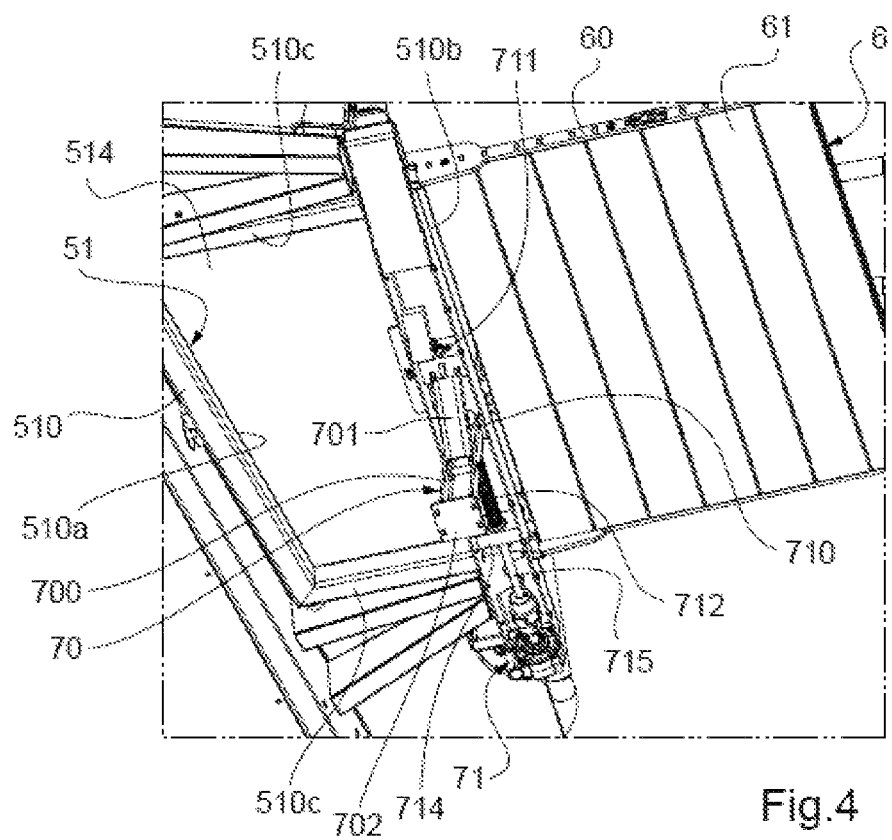
Figure 5:
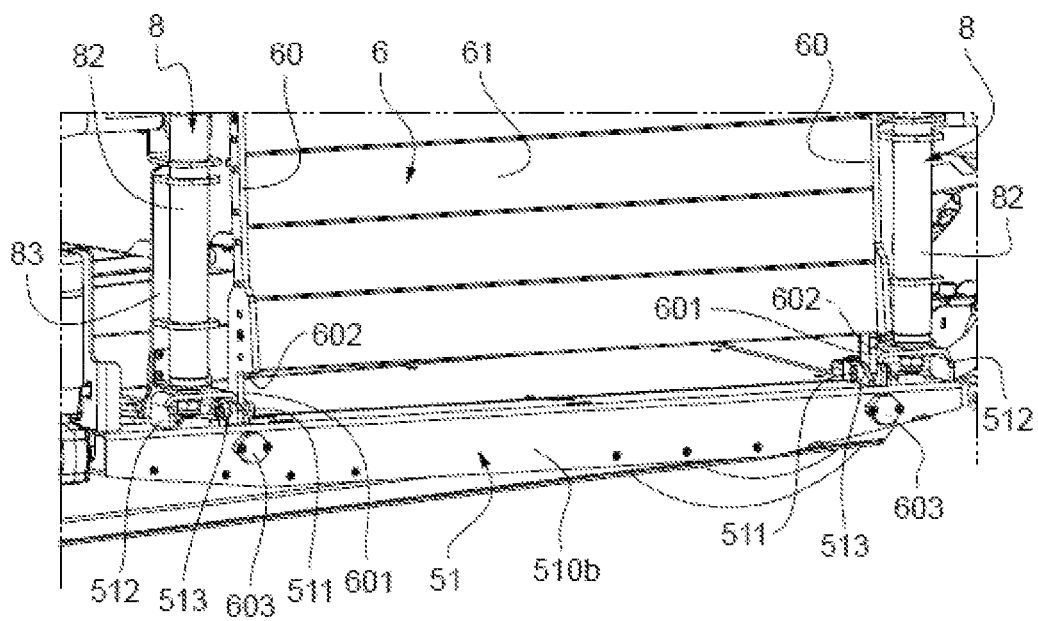
Figure 6:
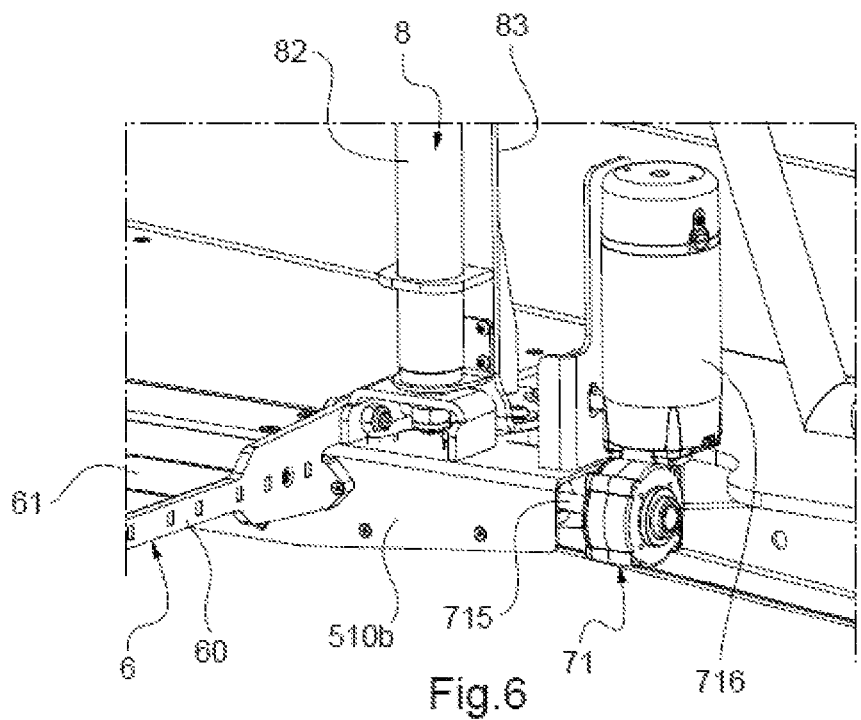
Figure 7:
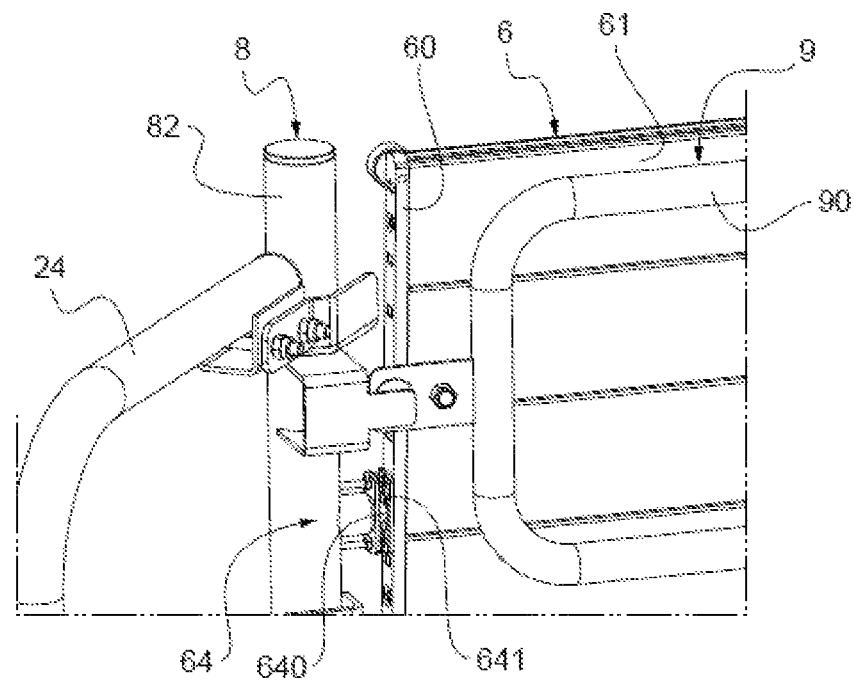
Figure 8:
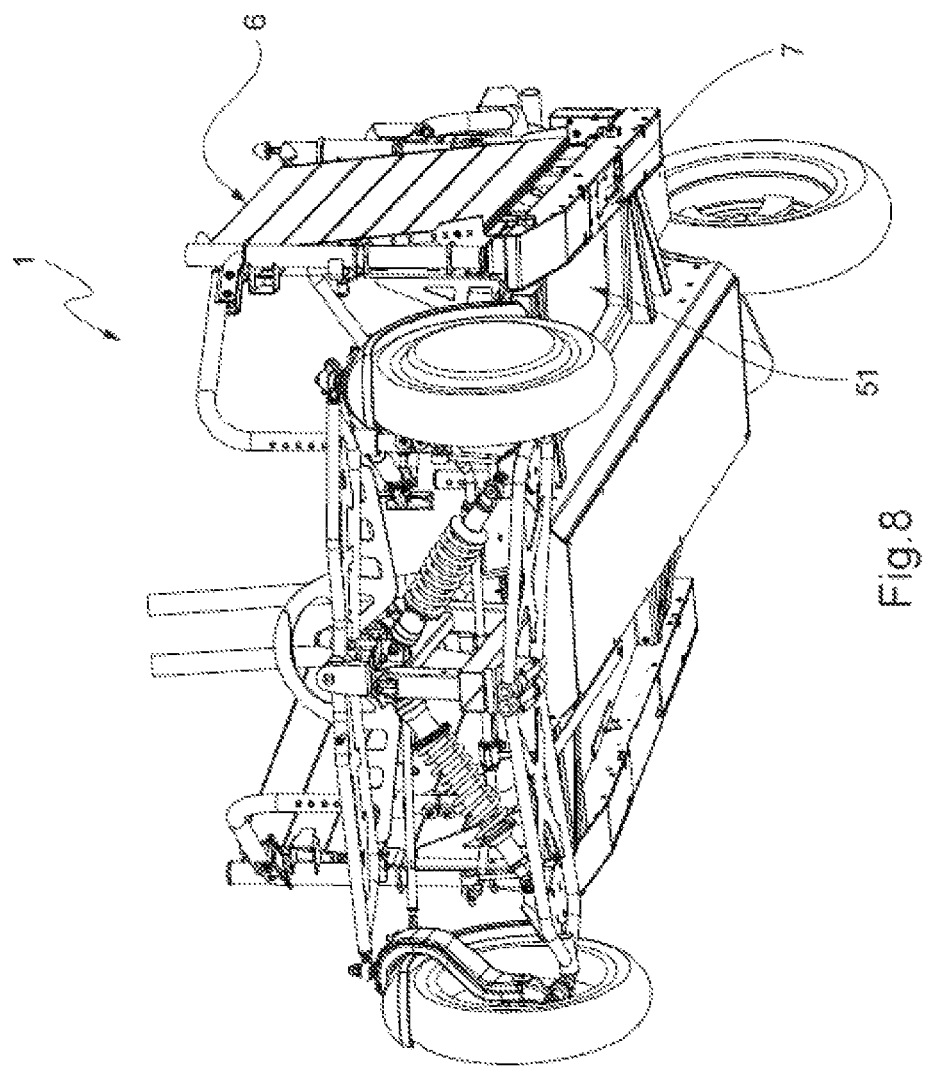
Figure 9:
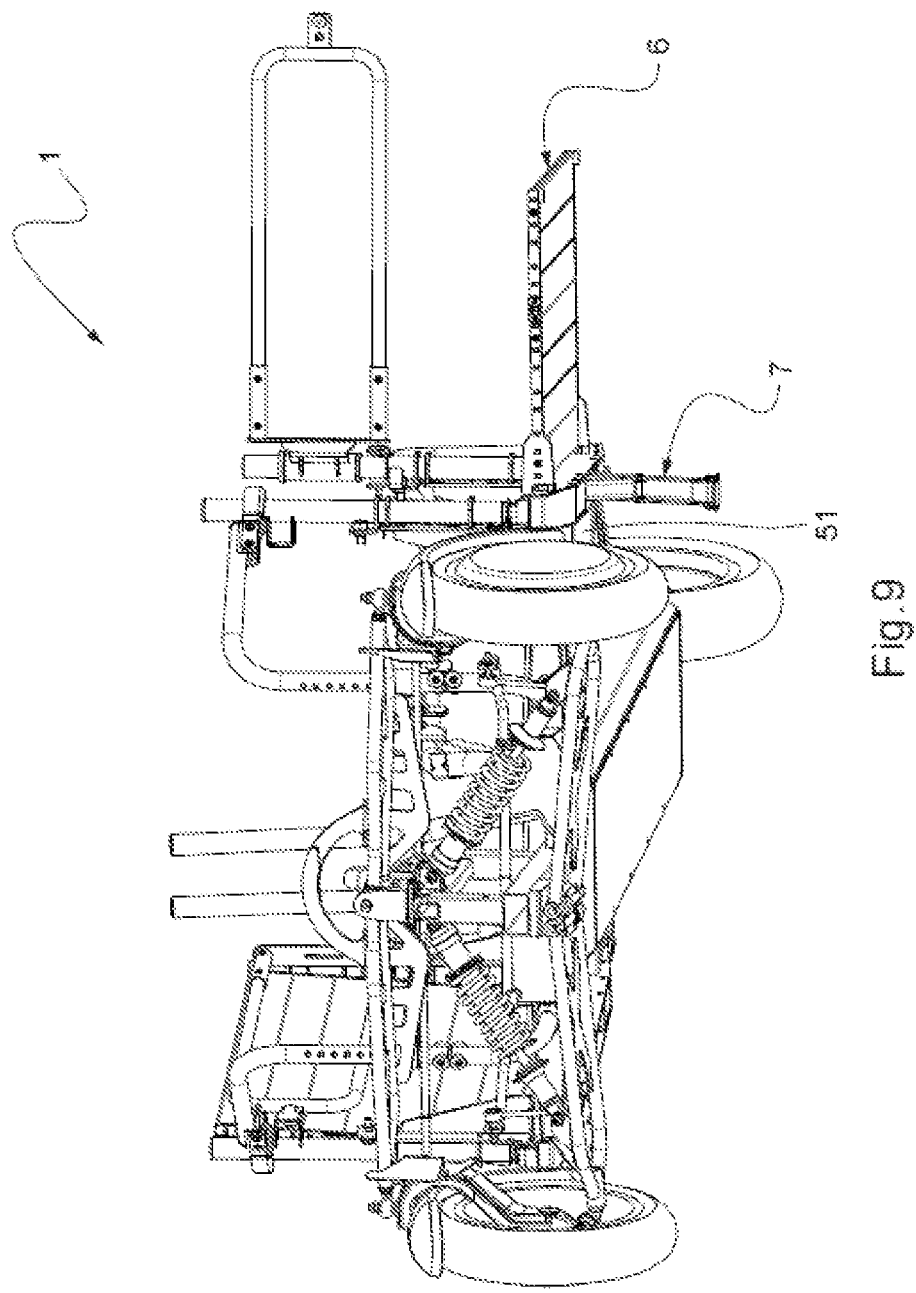
Figure 10:
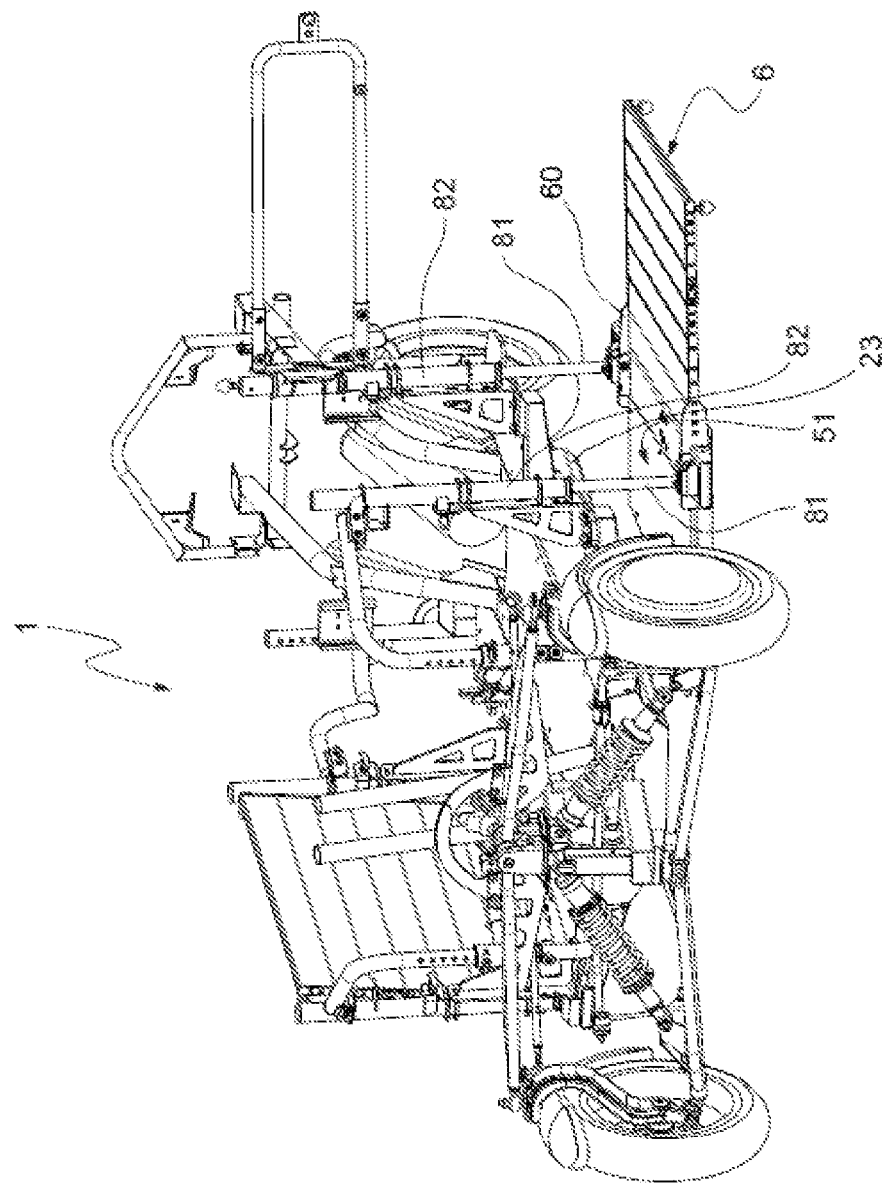
Figure 11:
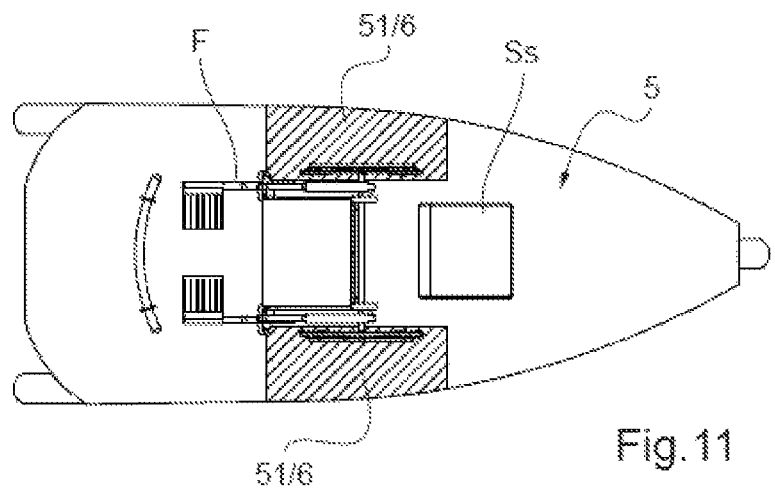
Figure 12:
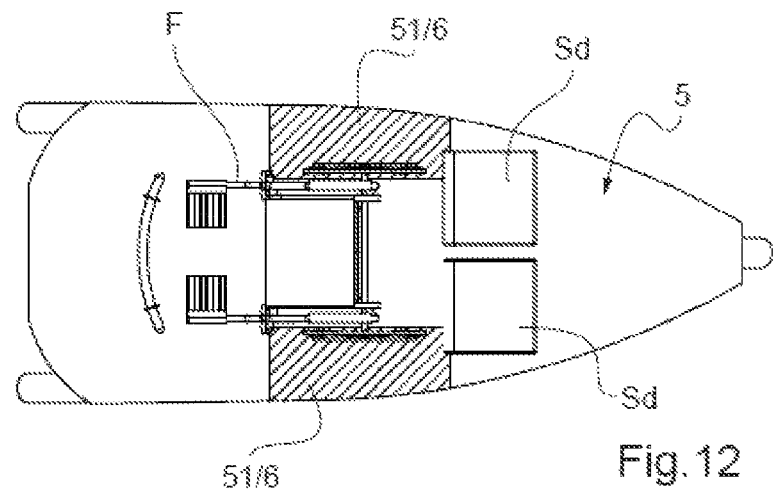
Figure 13:
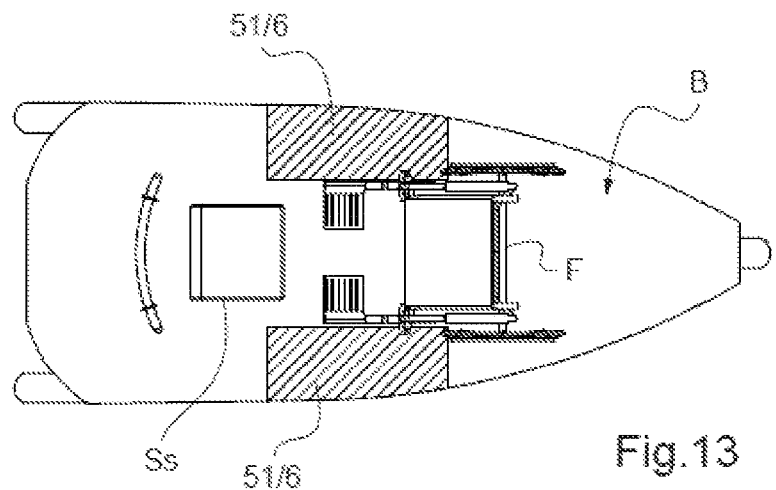
Figure 14:
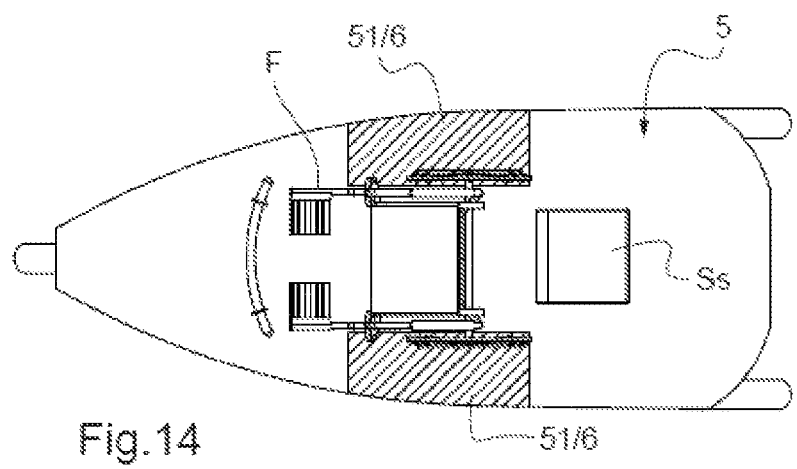
Figure 15:
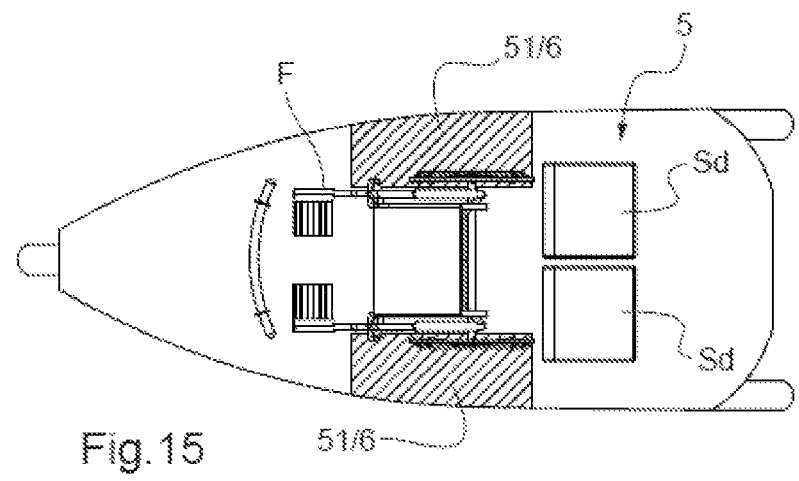
Figure 16:
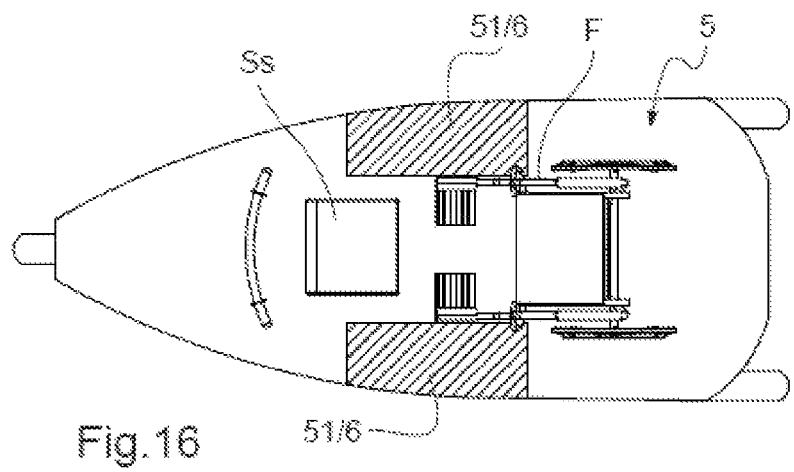
Figure 17:
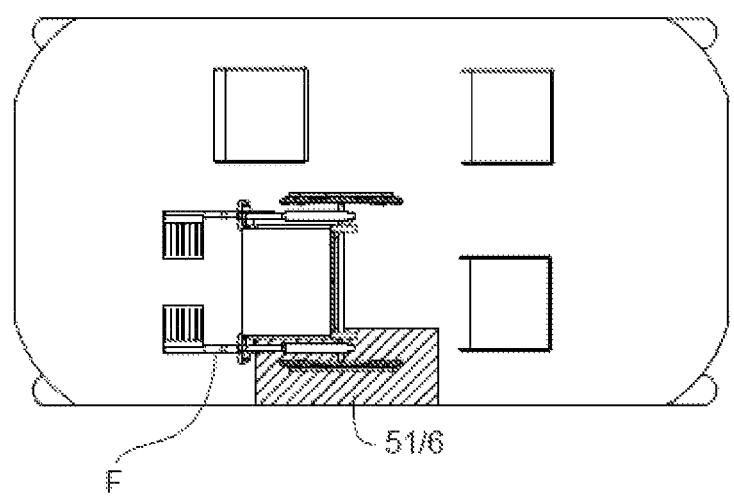
Figure 18:
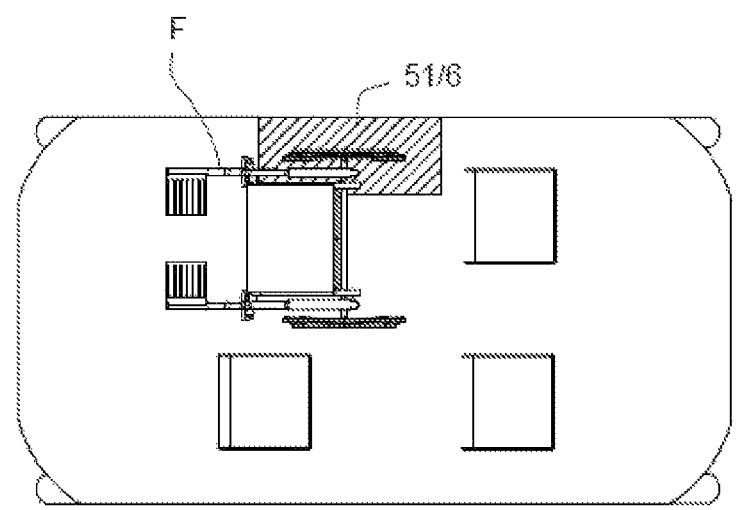
Figure 19:
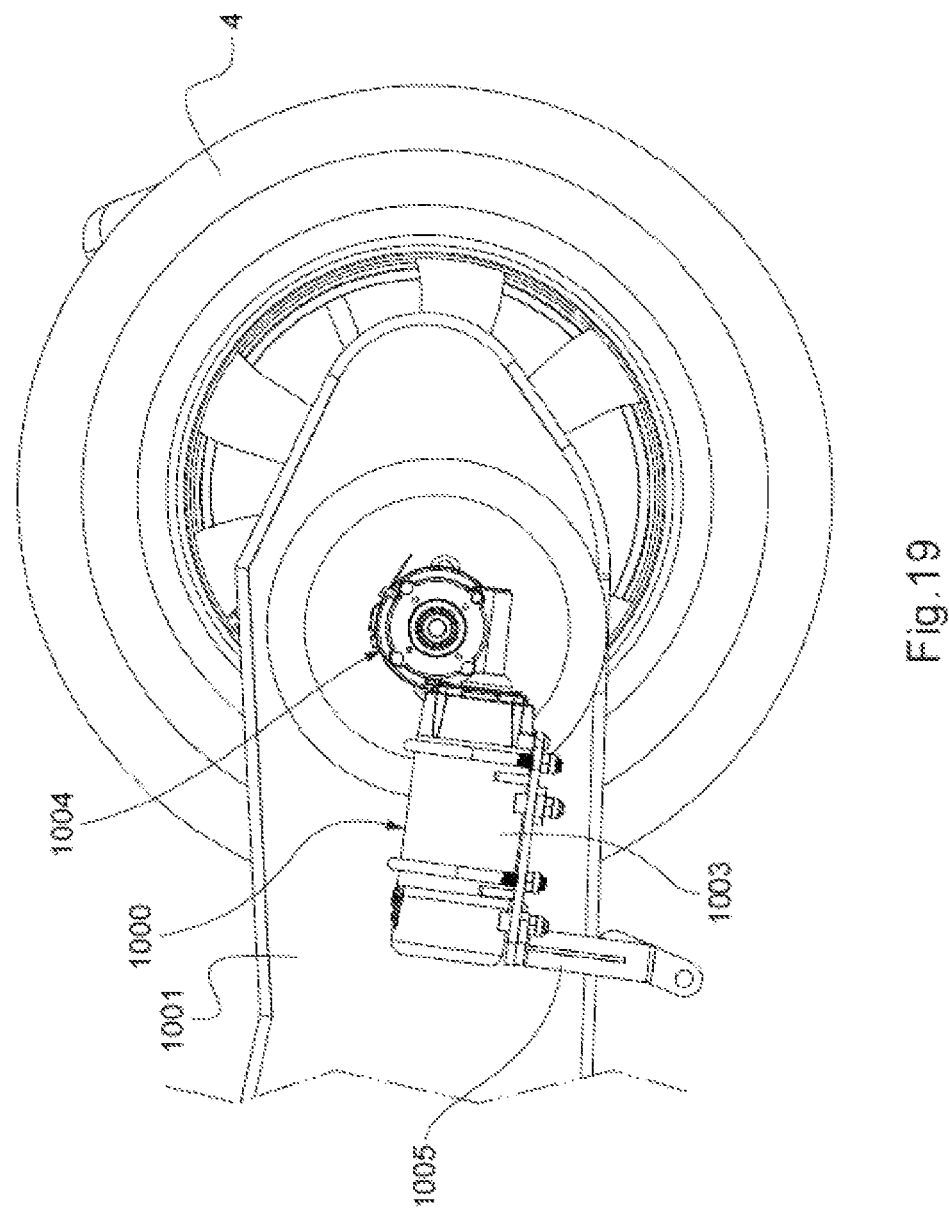
Figure 20:
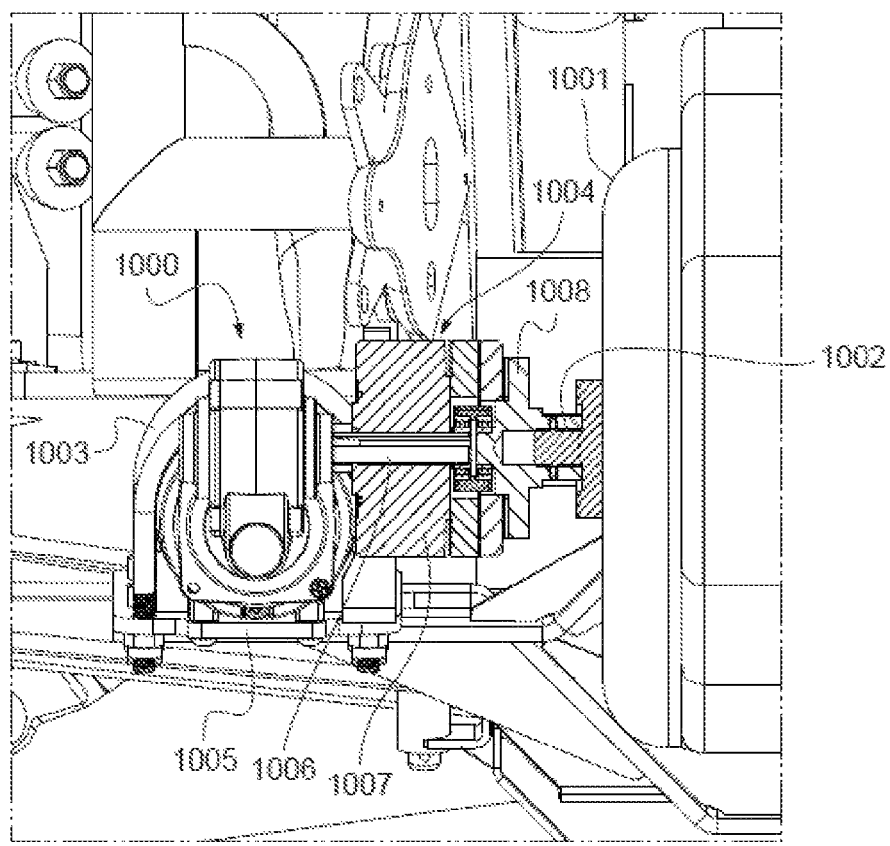

In these drawings:

FIG. 1: perspective view of a motor vehicle according to a particular embodiment of the present invention, here a tricycle, in the configuration with the folding side in the lowered position, the movable portion in the high position and the stand unfolded on the right of the view, and in the driving position on the left of the view;

FIG. 2: top perspective view of the chassis frame of the vehicle of FIG. 1, with the presence of a folding side;

FIG. 3: bottom perspective view of the chassis frame of FIG. 2;

FIG. 4: detailed view, from below, of the stand in the unfolded position;

FIG. 5: detailed view of the connection between a folding side and the respective movable portion, with the folding side in the raised position;

FIG. 6: detailed view similar to FIG. 5, with the folding side in the lowered position;

FIG. 7: detailed view of the folding side in the raised position, showing the means for locking it in the raised position;

FIG. 8: perspective view of the vehicle in driving configuration, i.e., with the folding side in the raised position, the movable portion in the high position and the stand in the folded position;

FIG. 9: perspective view of the vehicle in the configuration with the folding side in the lowered position, the movable portion in the high position and the stand in the unfolded position;

FIG. 10: perspective view of the vehicle in the configuration with the folding side in the lowered position, the movable portion in the low position and the stand completely folded;

FIG. 11: schematic top view of a tricycle type vehicle, with two steerable front wheels and one rear wheel, and a single seat behind the driving position;

FIG. 12: view similar to FIG. 11, but with two seats at the rear;

FIG. 13: view similar to FIG. 11, but with a seat in the front and a wheelchair at the rear;

FIG. 14: view similar to FIG. 11, but for a tricycle type vehicle with one front steerable wheel and two rear wheels;

FIG. 15: view similar to FIG. 14, but with two seats at the rear;

FIG. 16: view similar to FIG. 14, but with a seat at the front and a wheelchair at the rear;

FIG. 17: schematic top view of a four-wheeled vehicle, with a movable portion forming part of the driving position;

FIG. 18: similar view to FIG. 17, but with a movable portion forming part of a passenger section;

FIG. 19: side view of the rear wheel and the reverse gear system of the vehicle; and FIG. 20: partial longitudinal sectional view of the reverse gear system of FIG. 19.

Referring first to FIG. 1, it can be seen therein, represented in perspective view, a motor tricycle 1 according to a particular embodiment of the present invention, which has been illustrated without bodywork.

The motor tricycle 1 comprises, in a similar manner to the motor tricycle of the French application FR 3 005 931, a chassis frame 2, two front steerable wheels 3, a rear wheel 4, a platform 5 for accommodating the driver and, if desired, one or two passengers behind the driver, and two side doors 6.

Referring now to FIG. 2, it can be seen that the chassis frame 2 is generally H-shaped, and thus comprises a central portion 20 and, on either side thereof, a front lateral extension 21 and a rear lateral extension 22 at a distance from each other. The central portion 20 has a general form of a rectangular frame comprising two side rails 200 (FIG. 3), the ends of which are connected at the front by a crossmember 201 and at the rear by a crossmember 202. Each lateral extension 21 and 22 is formed by two beams, 210 and 220 respectively, which extend outwardly from a respective side rail 200, approaching each other as they extend away from the side rail 200, so that the free ends of the beams 210, 220 are close to each other. On each side of the central portion 20 is thus formed a space 23 (FIG. 10) delimited by the side rail 200 and the two beams 210, 220.

Referring to FIG. 1, it can be seen that the platform is supported by the chassis frame 2 and comprises in particular a central, stationary portion 50 and two vertically movable lateral portions 51.

The stationary portion 50 corresponds to the central portion 20 and to the lateral extensions 20, 21 of the chassis frame 2, on which have been attached plates for closing the openings that the chassis frame 2 has.

Referring also to FIG. 2, it can be seen that each movable portion 51 comprises a rigid frame 510 across which a closing plate 514 extends (FIG. 1).

The frame 510 is dimensioned such that at least a portion of the frame 510 extends into the space 23 when the movable portion 51 is in the high position.

Here, the frame 510 is formed by an inner longitudinal member 510a, an outer longitudinal member 510b, and two crossmembers 510c connecting them at their ends. In the high position, the inner longitudinal member 510a is located in the vicinity of the side rail 200 of the chassis frame 2 while each crossmember 510c is located in the vicinity of a respective beam 210, 220. The inner longitudinal member 510a thus has a length at least slightly less than the length of the space 23. The outer longitudinal member 510b, on the other hand, has a length greater than the length of the space 23, and to this end the crossmembers 510c extend beyond the beams 210, 220, so that the outer longitudinal member 510b is located outside the space 23. In particular, each end of the outer longitudinal member 510b is located, when the movable portion 51 is in the high position, opposite the free ends of the beams 210, 220 forming one of the lateral extensions 21, 22.

Referring further to FIG. 3, it can be seen that the outer longitudinal member 510b has a cross-sectional profile that is generally U-shaped, with its opening directed downward, to receive means 7 for controlling the movement of the movable portion 51 between the high and low positions, and which will now be described in more detail.

As can be better seen in FIG. 4, the means 7 consist here, in a general way, of a stand 70 foldable into the outer longitudinal member 510b and of motorization means 71 for unfolding/folding the stand 70.

The stand 70 comprises a main arm 700 and a secondary arm 701. One end of the main arm 700 is intended to come to bear on the ground, and is provided with a plate 702, while the other end terminates as a clevis that is located inside the outer longitudinal member 510b and across which is mounted, in an articulated manner, a part 710. The secondary arm 701 has one end articulated to the main arm 700, generally midway along the latter, and has its other end articulated to a bearing 711 secured to the inside of the outer longitudinal member 510b. The main arm 700 has a U-shaped profile, and the secondary arm 701 is sized to be able to be lodged within the main arm 700 when the stand 70 is in the folded position.

The motorization means 71 are based on a helical connection type drive, here implemented by a ball screw comprising a ball splined shaft 712, extending through the part 710 which is here a sleeve, and a means for driving the splined shaft 712 in rotation.

The splined shaft 712 extends inside the outer longitudinal member 510b and is supported, at a first end, by the bearing 711, and at a second end by a bearing 714 mounted fixedly in the outer longitudinal member 510b, at which the splined shaft 712 is coupled to a drive shaft 715 also extending along the outer longitudinal member 510b and projecting out of the rear end thereof, at one end of which it is coupled to a motor 716 (FIG. 6), for example an electric motor, configured to be able to rotate the drive shaft 715, and thus the splined shaft 712, in both directions of rotation. The motor 716 is remotely controllable.

Due to the helical connection between the stand 70 and the splined shaft 712, a rotation of the latter in a first direction of rotation will result in a translational movement of the sleeve 710 in the direction away from the bearing 711, and thus in a folding of the stand 70 towards the inside of the outer longitudinal member 510b, whereas a rotation of the splined shaft 712 in a second direction of rotation, opposite to the first one, will result in the sleeve 710 being brought closer to the bearing 711, and thus in an unfolding of the stand 70.

As will be described below, the folding and unfolding of the stand 70 allows, depending on the position of the movable portion 51, to move the latter vertically between a high position, in which the movable portion 51 is at the level of the stationary portion 50 of the platform 5, and a low position, in which the movable portion 51 is at a lower height than that of the stationary portion 50.

Locking means for locking each movable portion 51 in position are further provided to immobilize the movable portion 51 in any of the low and high positions and in any position between them. These locking means may in particular be integrated within the motor 716, and consist, for example, of a power failure brake in the case of an electric motor 716: in the absence of control of the locking means, thus in cases where it is not desired to move the movable portion 51, the brake automatically prevents the movable portion 51 from moving, and this without consuming energy.

The movement of each movable portion 51 relative to the chassis frame 2 is guided by the translation guiding means 8, which generally consist here of two sliding connections between the movable portion 51 and the chassis frame 2.

In the embodiment represented, as can be seen in FIGS. 5 and 10, each sliding connection, one at each end of the outer longitudinal member 510b, comprises a rod 81 that is secured to the outer longitudinal member 510b and extends vertically, upwards, from the latter, and at least one plain bearing, here two plain bearings, mounted in a cylindrical tube 82 extending vertically, upwards, from the free ends of the beams 210, 220 forming a lateral extension 21, 22, to which it is fixed by a bracket 83 the horizontal wing of which is fixed to said beams 210, 220, and the vertical wing of which is fixed to the tube 82. Each rod 81 is fixed, at its lower end, by any appropriate means, to one of the free ends of the outer longitudinal member 510b, which as indicated above is located opposite the free ends of the beams 210, 220, and extends in a sliding manner in the tube 82, passing through the plain bearing or bearings.

The lateral portion 51 is thus guided in vertical translation at each of the two free ends of the outer longitudinal member 510b.

It is emphasized here that each tube 82 is also fixed to the chassis frame 2 at the upper end of the tube 82, in particular fixed if applicable to a front tubular structure or a rear tubular structure 25 secured to the chassis frame 2 and provided respectively in front of the front lateral extensions 21 or behind the rear lateral extensions 22 (FIGS. 1 and 2).

The tubular structures 24, 25 can be used as guardrails and as a support for the attachment of accessories, for example safety accessories such as reflectors, safety lamps, etc., or as represented, arms carrying clamps 713 intended to be clamped onto the tubes of the wheelchair frame so as to immobilize the latter on the platform.

In addition, safety means 52 are also provided, for the automatic locking of the movable portion 51 when it reaches the high position as well as for its manual unlocking. As can be seen in FIG. 2, for example, these safety means 52 may comprise, for each movable portion 51, two handles 520, each carried by a support 521 secured to a tube 82, each handle 520 having a locking finger which, in a so-called locking position, extends through a corresponding hole in said tube 82 and the free end of which is received, in the locking position, in a recess provided for this purpose in the respective rod 81. The handles 520 are spring biased towards the locking position. When it is desired to move the movable portion 51 downwards, the stand 70 is first unfolded to the ground, then both handles 520 are pulled to disengage the locking fingers from the rod 81 and the tube 82, so as to allow the rod 81 to slide in the tube 82, and then the handles 520 are rotated, for example, by at least a quarter turn, into a position where the locking fingers are held disengaged. Prior to raising, each handle 520 will be rotated in the opposite direction, for example at least a quarter turn, such that the locking finger extends through the corresponding tube 82 and will automatically engage the recess in the rod 81 upon reaching the high position.

The manner in which the folding sides 6 are connected to the movable portion 51 will now be described with reference to FIGS. 5 and 6.

First of all, each folding side 6 is here formed by two bars 60 across which is placed a closing means 61 such as, for example, based on sheet metal.

Each folding side 6 is connected to a respective movable portion 51 so as to be pivotable between a raised position (left folding side in FIG. 1), in which it extends substantially vertically, and a lowered position, in which it extends horizontally or is slightly inclined towards the interior of the motor tricycle 1 (right folding side in FIG. 1). It may be emphasized here that in this embodiment each folding side 6 constitutes the side door of the vehicle 1 in the raised position.

In the embodiment represented, this connection between the folding side 6 and the movable portion 51 is provided at each section of the outer longitudinal member 510b that is located in the vicinity of the end of the space 23. A fastening tab 511 and a U-shaped fastening piece 512, used for fastening the rod 81, are carried by the outer longitudinal member 510b, on top of the latter, and one end of a bar 60 extends between them. Each of the fastening tabs 511, the fastening piece 512, and the end of the bar 60 has a hole therethrough, with the holes aligned and a pivot 513 extending fixedly therethrough. The holes in the ends of the two bars 60 are sized to allow pivotal movement of the bars 60, and thus of the folding side 6, about the pivot axis formed by the two pivots 513. In addition, said ends of the bars 60 each has an angled step 601 complementary in shape to that of the outer beam 510b, in particular forming a stop face 602. Two stops 603 are attached to the outer vertical face of the outer longitudinal member 510b.

The various elements above are sized and arranged so that in the lowered position, each stop face 602 abuts the respective stop 603 and each bar 60 also bears against the upper face of the outer longitudinal member 510b, so as to safely stop the downward pivoting of the folding side 6 in the lowered position.

The folding sides 6 are held in the raised position by push-lock means 64, which can be better seen in FIG. 7.

Each tube 82 carries a lug 640 extending towards the folding side 6, and this folding side 6 has a hole 641 on each of its two side edges, which are vertical in the raised position, in which the end of the lug 640 engages, thus immobilizing the folding side 6. Simply pushing on the folding side 6 disengages the lug 640 from the hole 641 or engages it in the hole 641.

The folding sides 6 can be raised from the lowered position to the raised position by manual means 9 formed here by a handrail 90 mounted on the rear side of the tube 82 so as to be pivotable about the axis of the tube 82, and by an inextensible connecting means between the handrail 90 and an edge of the folding side 6, for example a side or outer edge, as for example by a strap or a belt (not represented).

The manner in which the driver can get on or off the vehicle 1 will now be described with reference to FIG. 1 and FIGS. 8 to 10.

In the driving configuration of the vehicle 1 (FIG. 8), the movable portions 51 are in the high position, the folding sides 6 are in the raised position, the stands 70 are in the folded position and the safety means 52 are in the locking position. The driver, and possibly one or two passengers behind him, is located on the platform 5 composed of the stationary portion 50 and the two movable portions 51 which are in the same plane. The folding sides 6 constitute the doors that close the passenger compartment laterally.

After stopping the vehicle 1, the driver wishing to get down on one side will move the appropriate folding side 6 from the raised position to the lowered position, the respective movable portion 51 remaining in the high position. This is done simply by disengaging the push-lock means 64, with the folding side 6 pivoting downwards due to its weight and the driver controlling the opening of the folding side 6 by accompanying the pivoting of the handrail 90 caused by that of the folding side 6.

The driver then controls the unfolding of the stand 70, by controlling the motor means 716, until the plate 702 comes into contact with the ground, and only then does he disengage the safety means 52 by pulling on the handles 520 and then rotating them. The stand 70 allows to stabilize the movable portion 51/folding side 6.

It is emphasized here that the unfolding can be continued even after contact with the ground, in order to correct the attitude of the vehicle 1 in case for example the road is inclined. The continued unfolding of the stand 70 will lead the front or rear part of the vehicle 1 to rise correspondingly until its attitude is horizontal, this movement being allowed by the shock absorbers of the vehicle 1.

FIG. 9 shows the motor tricycle 1 in the configuration with the folding side 6 in the lowered position, the movable portion 51 in the high position and the stand 70 in the unfolded position.

The driver can then position himself on the movable sub-platform formed by the folding side 6 and the movable portion 51. The fact that the folding side 6 is horizontal or slightly tilted upwards allows, in case the driver is in a wheelchair, to avoid the wheelchair rolling involuntarily outwards.

The driver then controls the motor 716 to fold up the stand 70, and because the safety means 52 have been disengaged, the movable sub-platform will descend vertically, while remaining horizontal.

This descent is stopped by the driver, simply by stopping the motor control 716, at the desired height, for example at the height of a sidewalk on which the outer edge of the folding side 6 will have come to bear. The driver then simply goes off the movable sub-platform.

The movable sub-platform can be lowered until the stand 70 is fully folded into the outer longitudinal member 510*b*, as represented in FIG. 10. This allows the movable sub-platform to be lowered to the roadway, in the event that the driver does not goes off to a sidewalk.

Once the driver has left the movable sub-platform, the driver rotates the handles 520 for locking fingers, and can operate the motor 716 to unfold the stand 70, which will cause the movable sub-platform to rise, until the movable part 51 is in the high position and locked by the safety means 52. The stand 70 can then be folded back into the outer longitudinal member 510*b* and the driver can raise the folding side 6 by pushing on the handrail 90 after moving to one side, and then pressing against the folding side 6 to engage the push-lock means 64.

It will be easily understood that when the driver wishes to get back into the vehicle 1, after having placed himself on the side of the place where the movable sub-platform will come to be placed on the ground, it is enough for the driver first to unlock the folding side 6 by disengaging it from the locking means with the push-lock 64, then to control its opening with the handrail 90, then to control the unfolding of the stand 70 to the ground, then to disengage the safety means 52, then to control the folding back of the stand 70 to make the movable sub-platform go down to the desired height, at which point the driver can get on to it. Once on it, the driver rotates the handles 520 so that they are spring-returned to the locking position, the driver then controls the unfolding of the stand 70 to make the movable sub-platform rise to the high position, the movable portion 51 then being automatically locked at its arrival in the high position by the safety means 52, then the driver folds back the stand 70 in the outer longitudinal member 510*b* and, after the driver has placed himself in the driving position, the driver raises the folding side 6 and engages it in the push-lock means 64. The vehicle 1 is then again in the driving configuration.

It is understood that the particular embodiment just described has been given as an indication and is not limiting, and that modifications may be made without departing from the present invention.

For example, a single seat Ss or a double seat Sd can be provided behind the driving position, as illustrated schematically in FIGS. 11 and 12, respectively. This seat, whether single or double, will advantageously be foldable so as to allow a wheelchair F to be placed at the rear, as illustrated in FIG. 13, in which it can be seen that it is possible to provide a seat Ss at the front, which will advantageously be removable, because it will be connected to the platform, for example, by quick-fixing means, or will be foldable.

It is also possible to provide these same configurations on a tricycle having a single front steerable wheel and two rear wheels, as illustrated in FIGS. 14 to 16.

Alternatively, a platform could be provided that allows two wheelchairs to be positioned one behind the other, one in the driving position and the other at the rear.

Furthermore, as previously indicated, the principle of a movable portion and a folding side according to the present invention is not limited to an application to a motor tricycle but is as well applicable to four-wheeled vehicles, as illustrated in FIGS. 17 and 18, or more, such as six-wheeled vehicles with four rear wheels. In the case of a vehicle with at least four wheels, it is emphasized that the movable portion can be positioned to be part of, in the high position, the driving position, as illustrated in FIG. 17, or be located on the passenger side as illustrated in FIG. 18. It is of course also possible to provide more than one movable portion, for example, two movable portions, one on each side, and the movable portion(s) could just as well be placed at the front or at the rear of the vehicle.

Above, the features of the vehicle 1 that allow a person with reduced mobility to get on/off have been described. The vehicle 1 is also equipped with a reverse gear system 1000 shown in FIGS. 19 and 20.

In the embodiment represented, the rear wheel 4 is a drive wheel rotated by a forward drive system similar to that found on two-wheeled vehicles of the scooter type, in which the power supplied by a forward drive means, located in front of the reverse gear, is transmitted, by a belt, to a drivetrain, for example composed of a primary drivetrain and a secondary drivetrain, which is engaged with the wheel axle of the rear wheel 4 so as to rotate it in the forward direction. The belt and drivetrain are conventionally protected by a housing 1001 which can be seen in FIGS. 19 and 20.

Since the present invention not being limited to any particular forward drive system, and since such systems are well known per se, they will not be described in further detail. It may be emphasized, however, that in the illustrated embodiment, the drivetrain includes a primary drivetrain and a secondary drivetrain, and the drive shaft 1002 (FIG. 20) of the primary drivetrain extends outwardly a distance such that its end region protrudes from the housing 1001.

The reverse gear system 1000 includes a motor 1003 and a clutch 1004 interposed between the motor 1002 and the drive shaft 1001.

The motor 1003 is an electric motor carried by a support 1005 that is itself attached to the housing 1001. In particular, the motor 1003 is an angle drive motor, well known per se, which allows it to be oriented so that its longitudinal direction is parallel to that of the vehicle 1, and thus to obtain a more compact arrangement of the reverse gear system 1000.

The output shaft 1006, or driving shaft, of the motor 1003 is thus parallel to the wheel axle of the rear wheel 4, as can be seen in FIG. 20.

The clutch 1004 is here a toothed electromagnetic clutch, a first part 1007 of which is made rotationally secured to the output shaft 1006 by any suitable means, such as by key, and a second part 1008 of which is rotationally secured to the end region of the drive shaft 1001 by any suitable means, such as by key. Since the electromagnetic toothed clutch and its operating principle are well known per se, it is not necessary to describe them in further detail.

The motor 1003 and the clutch 1004 are both electrically controlled here, which control may be remote from the driving position of the vehicle 1, in conjunction with the control of the forward drive system. Preferably, there will be a first button, which controls the turning on/off of the motor 1003, and a second button which controls the engagement/disengagement of the clutch 1004 and the driving in rotation/stopping of the output shaft 1006 of the motor 1003.

In forward motion, the clutch 1004 is automatically placed in the disengaged position, such that rotation of the drive shaft 1002 is not transmitted to the output shaft 1006 of the motor 1003.

When the driver wishes to shift into reverse, he must first press the first button, to start the motor 1003. If he then presses the second button, the clutch 1004 is brought to the engaged position and the output shaft 1006 is caused to rotate, this rotation being transmitted to the drive shaft 1002 through the clutch 1004, and from there to the wheel axle of the rear wheel 4. When the driver releases the second button, the output shaft 1006 stops rotating and the clutch 1004 is disengaged. Thus, the driver controls the movement of the vehicle in reverse by pressing the second button, and the driver controls the speed by pressing the second button for a longer or shorter time (pulse control).

It is emphasized here that during a reverse drive, the forward drive remains available to the driver: the acceleration and braking controls of the forward drive can be used at any time, as the clutch 1004 is disengaged upon release of the second button. This is particularly important because the driver must be able to move the vehicle without delay and, for example, not obstruct traffic.

Thus, it can be seen that the driver of the vehicle 1 will be able to perform correctly all the usual maneuvers that a vehicle should be able to perform, such as, for example, parallel parking.

The invention claimed is:

1. A motor vehicle, comprising:
a chassis frame,
a steerable front wheel assembly and a rear wheel assembly,
a platform for accommodating at least a driver of the motor vehicle, at least a portion of the platform being secured to the chassis frame, and
at least one lateral folding side located on one side of the platform and connected to the platform so as to be able to pivot between a raised position, in which the folding side has been raised and is generally vertical, and a lowered position, in which the folding side has been pivoted downwards to form a means of access by which a person can get onto the platform and get off the same,
wherein the platform comprises a stationary portion secured to the chassis frame and at least one lateral movable portion located at one side of the platform, the at least one movable portion being vertically movable relative to the stationary portion in such a way as to be able to be placed in a first position, called the high position, in which it is flush with the stationary portion, and a second position, called the low position, in which it is located at a lower height than that of the stationary portion, means being provided for controlling the vertical movement of the at least one movable portion, the at least one folding side being connected to a respective movable portion in such a way that the folding side and the respective movable portion are vertically movable in one piece between the high and low positions while the folding side is in the lowered position,
wherein the means for controlling the vertical movement of the at least one movable portion comprise, for each of the at least one movable portion:
a non-manual actuator formed by a stand foldable under the respective movable portion and able to be unfolded downwards from the respective movable portion, the stand being motorized by motorization means; and
means for guiding in translation the respective movable portion with respect to the chassis frame.

2. The motor vehicle according to claim 1, wherein the motor vehicle further comprises stabilizing means for stabilizing the motor vehicle during movement of the at least one movable portion between the high and low positions.

3. The motor vehicle according to claim 1, wherein the at least one movable portion forms part, in the high position, of the section of the platform where the driving position of the motor vehicle is located.

4. The motor vehicle according to claim 1, wherein the motor vehicle is a tricycle.

5. The motor vehicle according to claim 1, wherein the at least one movable portion forms part, in the high position, of a section of the platform intended to accommodate a passenger of the motor vehicle, the motor vehicle comprising two front wheels and at least two rear wheels.

6. The motor vehicle according to claim 1, wherein the motor vehicle comprises two folding sides, located on either side of the platform, and two movable portions.

7. The motor vehicle according to claim 1, wherein the at least one folding side constitutes, in the raised position, a side door of the motor vehicle.

8. The motor vehicle according to claim 1, wherein the motor further comprises at least two side doors, located on either side of the platform and capable of being opened and closed, each of the at least one folding side extending, in the raised position, opposite a respective side door, on an interior side of the vehicle, each of the at least one folding side being capable of being moved to the lowered position after opening the respective side door.

9. The motor vehicle according to claim 1, wherein the motor vehicle further comprises, for each of the at least one folding side, a non-manual actuator able to move the respective folding side between the raised position and the lowered position.

10. The motor vehicle according to claim 1, wherein each of the at least one folding side is connected in a freely pivotable manner to the respective movable portion of the platform, there being further provided, for each of the at least one folding side, manual raising means for raising the respective folding side from the lowered position to the raised position, as well as stopping means for stopping the respective folding side in the lowered position and locking means for locking the respective folding side in the raised position.

11. The motor vehicle according to claim 10, wherein the manual raising means comprise, for each of the at least one folding side, a horizontal handrail mounted so as to be pivotable about a vertical axis, the handrail being further connected to an edge of the respective folding side by a belt or a strap.

12. The motor vehicle according to claim 1, wherein the chassis frame is configured such that the at least one movable portion is, in the high position, inscribed in and protected by the chassis frame.

13. The motor vehicle according to claim 12, wherein the motor vehicle is a tricycle, and wherein the chassis frame comprises a central portion and, on each side thereof, a front lateral extension and a rear lateral extension, the chassis frame thus being H-shaped, a space being formed between the front and rear lateral extensions located on a same side of the central portion, in which space a respective movable portion of the platform is placed when in the high position.

14. The motor vehicle according to claim 1, wherein the means for controlling the vertical movement of the at least one movable portion are able to ensure a continuous vertical movement of the at least one movable portion and to stop this vertical movement at any height lower than that of the movable portion in the high position.

15. The motor vehicle according to claim 1, wherein the stand comprises a main arm and a secondary arm, the main arm having a first end articulated to a part that can be moved in translation and is located inside a hollow longitudinal member belonging to the respective movable portion, and a second end capable of coming to bear on a ground after the stand has been unfolded, the secondary arm being foldable inside the main arm and having a first end articulated to the main arm and a second end articulated to a bearing fixed inside said longitudinal member, and wherein the motorization means comprises said part and means for driving said part in translation in two opposite directions of translation.

16. The motor vehicle according to claim 15, wherein the part is a sleeve and the means for driving said part in translation comprise a shaft extending through said sleeve and along the inside of said longitudinal member and means for rotating the shaft that are able to rotate the shaft in two opposite directions of rotation, the sleeve and the shaft being connected by a helical connection such that a rotation of the shaft causes a translation of the sleeve.

17. The motor vehicle according to claim 1, wherein the motor vehicle comprises a reverse gear system able to drive in reverse rotation a wheel axle of the rear wheel assembly, the reverse gear system comprising:
    a dedicated motor means, comprising a driving shaft intended, in use, to rotate in a direction of rotation leading to a reverse movement of the motor vehicle;
    a selective coupling means controllable so as to couple or uncouple the driving shaft and the wheel axle; and
    means for controlling the selective coupling means.

18. The motor vehicle according to claim 17, wherein the motor vehicle comprises a forward drive system which comprises a motor means for forward drive, located forward of the rear wheel assembly and having a driving shaft connected by a belt to a drivetrain which comprises a drive shaft rotated by the belt and driving the wheel axle in forward drive rotation, the drive shaft extending outwardly so that an end section thereof lies beyond said belt, the selective coupling means being connected to said end section of the drive shaft.

\* \* \* \* \*